United States Patent
Berrangé

(10) Patent No.: US 9,928,098 B2
(45) Date of Patent: Mar. 27, 2018

(54) IDENTIFYING APPLICATION USAGE ROLES FOR DEVICES PROVIDED TO VIRTUAL MACHINES

(71) Applicant: Red Hat, Inc., Raleigh, NC (US)

(72) Inventor: Daniel Pierres Berrangé, Wimbledon (GB)

(73) Assignee: Red Hat, Inc., Raleigh, NC (US)

( * ) Notice: Subject to any disclaimer, the term of this patent is extended or adjusted under 35 U.S.C. 154(b) by 100 days.

(21) Appl. No.: 14/856,396

(22) Filed: Sep. 16, 2015

(65) Prior Publication Data
US 2017/0075711 A1    Mar. 16, 2017

(51) Int. Cl.
G06F 9/455    (2006.01)

(52) U.S. Cl.
CPC ...... *G06F 9/45558* (2013.01); *G06F 9/45545* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| 7,895,594 | B2 | 2/2011 | Kirilline et al. |
| 8,544,002 | B2 | 9/2013 | Edwards et al. |
| 8,645,953 | B2 | 2/2014 | Sekiguchi et al. |
| 8,752,045 | B2 | 6/2014 | Fitzgerald et al. |
| 9,038,083 | B2 | 5/2015 | Huang et al. |
| 2010/0223309 | A1 | 9/2010 | Benari |
| 2016/0054953 | A1* | 2/2016 | Lee .................. G06F 3/0659 710/74 |

OTHER PUBLICATIONS

"What are Device Tags?" https://cloud.verizon.com/documentation/WhatAreDeviceTags.htm, Retrieved on Sep. 11, 2015.
E. Scalavino et al. "A Labelling System for Derived Data Control" http://dl.ifip.org/db/conf/dbsec/dbsec2010/ScalavinoGL10.pdf, Retrieved on Sep. 11, 2015, pp. 1-16.
Daniel Pierres Berrangé, "specs/mitaka/approved/virt-device-role-tagging.rst", Available at https://review.openstack.org/#/c/195662/2/specs/mitaka/approved/virt-device-role-tagging.rst, Published on Jun. 25, 2015, Retrieved on Oct. 29, 2015.

* cited by examiner

*Primary Examiner* — Umut Onat
(74) *Attorney, Agent, or Firm* — Lowenstein Sandler LLP

(57) ABSTRACT

Embodiments of the disclosure provide techniques for or managing devices for a virtual machine. A method is provided that includes associating, by a processing device of a cloud management system, a device with a virtual machine. The device is associated, by a memory data structure, with an identifier tag including a character string. The virtual machine is notified of the identifier tag associated with the device. An application to be executed by the virtual machine is associated, using the identifier tag, with the device.

20 Claims, 6 Drawing Sheets

IDENTIFYING APPLICATION USAGE ROLES FOR DEVICES PROVIDED TO VIRTUAL MACHINES

TECHNICAL FIELD

The present disclosure is generally related to virtualized computer systems, and is more specifically related to systems and methods for managing and provisioning network resources in a virtualized environment.

BACKGROUND

A virtual machine (VM) is a software artifact that, when executed on appropriate hardware, creates an environment that allows for a virtualization of various resources of an actual physical computer system (e.g., a server, a mainframe computer, etc.). The actual physical computer system is typically referred to as a "host machine," and the operating system of the host machine is typically referred to as the "host operating system." On the host machine, a virtual machine monitor known as a "hypervisor" handles the provisioning of resources for and management of one or more virtual machines. The virtual machine monitor provides a variety of functions, such as initializing the virtual machines and executing requests by the virtual machines for the various resources of the host machine.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

The present disclosure is illustrated by way of examples, and not by way of limitation, and may be more fully understood with references to the following detailed description when considered in connection with the figures, in which.

DETAILED DESCRIPTION

Figure 1:
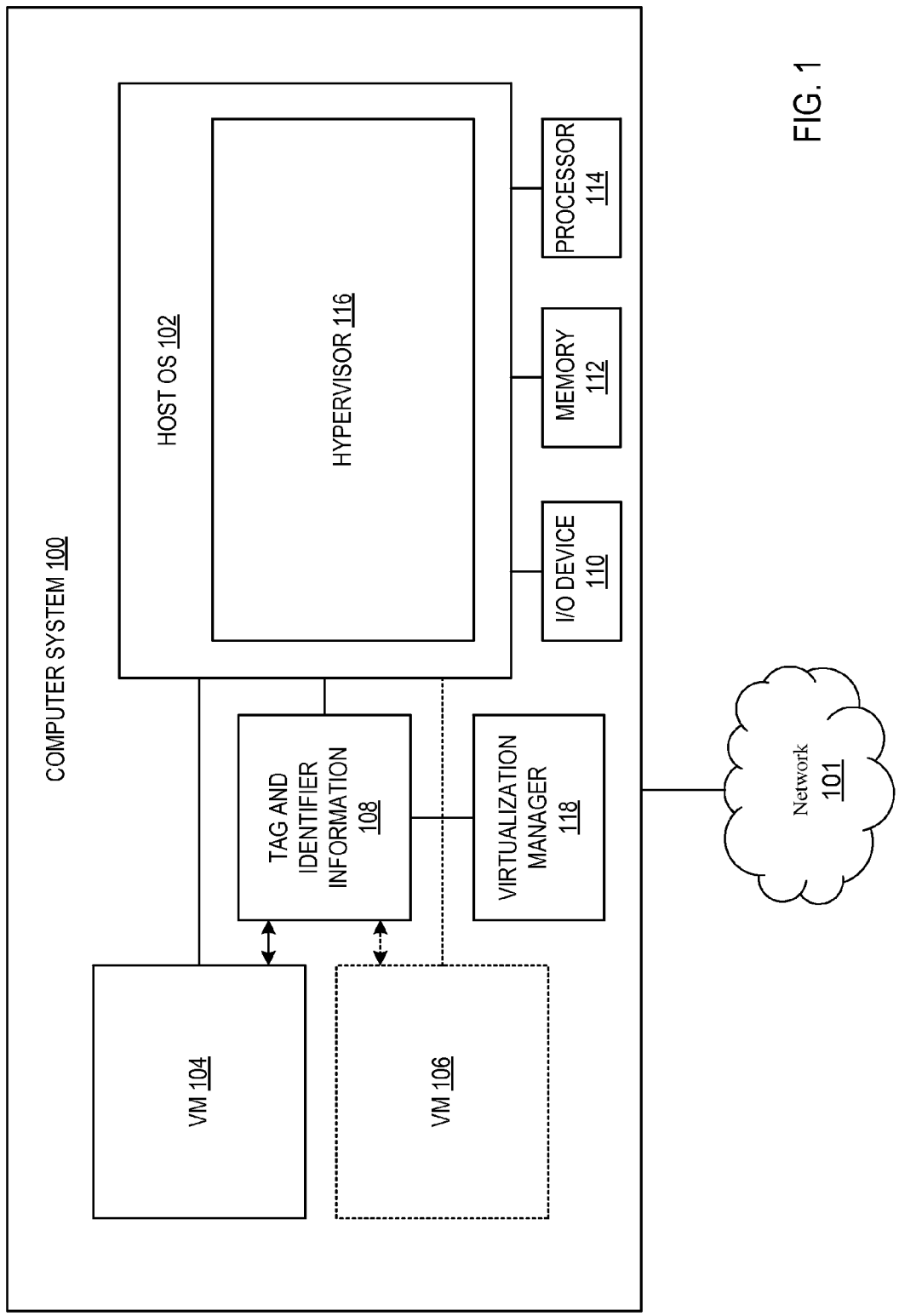
FIG. 1 is a system for managing devices for a virtual machine in accordance with one or more aspects of the present disclosure.

Described herein are techniques for identifying application-specific functions for devices provided to virtual machines. In a virtualized environment, there is typically a hypervisor component that can run a plurality of "guest" domains (e.g., operating systems and virtual machines) on a host platform. The hypervisor may provide a device emulation framework, such as quick emulator (QEMU®), on the host machine that allows each guest domain to have a complete virtualized machine platform to run on. The hypervisor may manage resources for virtual machines operating in a cloud environment or other local or network environment. The hypervisor may also be considered to form at least part of a cloud management system. In some embodiments, the hypervisor or another virtualization manager may be separate from the host machine. The host machine provisions each guest or virtual machine with one or more hardware or virtual devices. For example, the host machine may provision a virtual machine with a processor, a memory, a network interface, etc. In some instances, a virtual machine may be given access to multiple devices of the same type. For example, the host machine may provision a virtual machine with more than one storage or network device. In some instances, the entity provisioning the virtual machine may intend a specific function for one or more of the devices made available to the virtual machine. For example, a particular storage device may be intended for use with a specific database (such as a PostgreSQL) while another storage may be intended for use with another particular format or plurality of formats. A network interface provided to the virtual machine by the host may be intended to be used for delivering public web server content. Other uses or purposes may be established for other devices and resources available to the host machine for provisioning the virtual machine.

While the host or entity provisioning the virtual machines may be aware of the nature of the devices and their intended uses, this information on the application-specific functional designation of the devices may not always be presented to the virtual machine and the operating system of the virtual machine (guest OS). As the guest OS manages the devices provisioned to it, it may be difficult for the guest OS to properly assign a device within the virtual machine based on a purpose or function intended for each device until after the device has already been allocated. In some cases, the user or other entity provisioning the virtual machine may not have enough information (such as the unique PCI or MAC address) to be able to provide accurate instruction to the virtual machine on how to identify the devices or configure applications to use the devices as intended by the host. This inability to communicate device information for management of the virtual machines makes automated setup tasks for the virtual machines difficult or potentially impossible. This is particularly challenging in a cloud-based system as information relating to device configuration during provisioning is generally hidden from the entity provisioning the virtual machine.

In some embodiments, the techniques disclosed herein may allow an entity provisioning the virtual machine to associate an "identifier tag" (e.g., represented by a character string) to each device available. The tag is associated with identifier information which allows the virtual machine to identify the device and its intended function. In some embodiments, the provisioning entity may provide the tag and identifier information to the virtual machine to allow for setup of the devices to be used for functions for which the corresponding devices are optimized or intended to be used within the virtual machine. As used herein, the term "tag" may refer to only the string portion alone or to the string in conjunction with the associated identifier information.

In operation, generation of the tag may include receiving, via a user interface, an arbitrary string corresponding to a specific device. For example, the user may enter a string such as "database" as a tag for a storage device. The host machine may provide identifier information to be included as part of the tag automatically or facilitate manual entry of the information by a user. In some embodiments, the entity provisioning the virtual machine may communicate the tag and the identifier information to the virtual machine. The tag and identifier information may be communicated to a virtual machine by creating a virtual disk and storing a data file to the disk with the identifier information associated with the tag. The information may be made available by exposing a web service to the guest OS to provide the information in response to a request from the virtual machine. As another example, the identifier information may be made available by storing the information to a basic input/output system (BIOS) which is accessible to the guest OS of the virtual machine. Other embodiments may provide other manners of making the device information available to the virtual machine.

In some systems, the identifier information associated with the devices may be formatted according to a system preference or with relation to the manner in which the information is communicated to the virtual machine. For example, some formats may include extensible markup language (XML), JavaScript® object notation (JSON), comma-separated values (CSV), etc.

In some embodiments, the tag may be generated by a hypervisor or virtualization manager and provided to an operating system of a new virtual machine during the provisioning of the new virtual machine. In another embodiment, the device information may be provided for a new device that is added and made available to an existing virtual machine. With the provided device information, the virtual machine is able to provide instructions to applications or generally to an operating system of the virtual machine for access to the devices and setup of the applications and programs that might utilize the devices provisioned to the virtual machine.

While some systems may require a provisioning entity to have relatively detailed and specific information relating to the resources or devices available for provisioning a virtual machine, aspects of this system facilitate associating a tag with a variety of types of resources and devices. The tag may be an arbitrary string or may be a string with some intuitive or specific connection to or association with the corresponding device. The system may, in response to reception of the tag, associate identifier information with the tag to provide specific information (such as a PCI, MAC address, serial number, etc.) for each device. The identifying information may be automatically gathered by a virtualization manager or other process in response to entry of the tag corresponding to a device. In another embodiment, a user interface may facilitate manual entry of identifier information for a device. Once the tag is generated and the identifier information has been gathered by the virtualization manager or hypervisor, the system may provide these to a guest OS of the virtual machine to identify and configure applications and services to use specific devices based on the tags and the identifier information included in the tag.

Although aspects of the present disclosure may be particularly useful with certain types of network devices/services, the techniques disclosed herein may be used with other types of devices (both physical and virtual), network services, or other resources that a virtual machine may access.

FIG. 1 depicts a high-level component diagram of an exemplary computer system 100 for managing devices for a virtual machine that may be used to implement one or more aspects of the present disclosure. The computer system 100 may be a server, a mainframe, a workstation, a personal computer (PC), a mobile phone, a portable computing device, etc. Embodiments of the system 100 may also be implemented in a cloud system. As shown, the computer system 100 may be coupled to a network 101. The network 101 may be a private network (e.g., a local area network (LAN), a wide area network (WAN), intranet, etc.) or a public network (e.g., the Internet). Computer system 100 may run "host" software or kernel, such as host operating system 102, that manages the hardware resources of the computer system 100 and that provides functions such as inter-process communication, scheduling, memory management, and so forth. In one embodiment, the host operating system 102 may also include a hypervisor 116, which may be software that provides a virtual operating platform for a set of virtual machines (VMs) 104 and 106, and manages the execution of these virtual machines 104 and 106. The computer system 100 may also include a virtualization manager 118 to manage the virtual machines 104 and 106.

The hypervisor 116 may take many forms. For example, the hypervisor 116 may be part of or incorporated in the host operating system 102 of computer system 100, or the hypervisor 116 may be running on top of the host operating system 102. Alternatively, the hypervisor 116 may be a "bare metal" hypervisor that runs on hardware of the computer system 100 without an intervening operating system. The hypervisor 116 manages system resources, including access to an I/O device 110, memory 112, processor 114, and so on. The hypervisor 116, though typically implemented in software, may emulate and export a physical layer of computer system 100 to higher level software. Such higher level software may comprise a standard or real-time operating system (OS), may be a highly stripped down operating environment with limited operating system functionality, may not include traditional OS facilities, etc. The hypervisor 116 presents to other software (e.g., virtual machines 104 and 106) an abstraction of the physical layer that may provide the same or different abstractions to various guest software, such as guest operating system, guest applications, etc.). Some examples of hypervisors include quick emulator (QEMU®), kernel mode virtual machine (KVM®), virtual machine monitor (VMM), etc.

The hypervisor 116 may support a plurality of virtual machines 104 and 106 residing on the computer system 100. In some embodiments, more than one hypervisor (not shown) may be provided to support the virtual machines 104 and 106 of the computer system 100. The virtual machines 104 and 106 may be a software implementation of a machine that executes programs as though the virtual machines 104 and 106 were an actual physical machine. Each virtual machine may execute a guest operating system and other types of software and/or applications. The hypervisor 116 can either handle request by the virtual machines 104 and 106 for machine resources, or forward the request to the host OS 102 or to the virtualization manager 118.

The hypervisor 116 provisions computing resources, such as all or part of a capacity of the processor 114 for use by the virtual machines 104 and 106. As illustrated, the processor 114 is communicatively coupled to the host OS 102, the memory 112, and the I/O device 110. These computing resources may also be tracked and assigned by the virtualization manager 118.

"Processor" herein refers to a device capable of executing instructions encoding arithmetic, logical, or I/O operations. In one illustrative example, a processor may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

"Memory" herein refers to a volatile or non-volatile memory device, such as RAM, ROM, EEPROM, or any other device capable of storing data.

"I/O device" herein refers to a device capable of providing an interface between a processor and an external device capable of inputting and/or outputting binary data. Although, for simplicity, a single processor 114 is depicted in FIG. 1, in some other embodiments the computer system 100 may comprise a plurality of processors. Similarly, in some other embodiments the computer system 100 may comprise a plurality of I/O devices, rather than a single device 110, and a plurality of memory devices rather than a single memory device 112.

In some embodiments, the computer system 100 may provide tag and identifier information 108 for the virtual machines 104 and 106. As provided herein, "tag" may refer to a string of characters. The term "tag" may also refer to the string of characters and the identifier information associated with the string of characters. For example, the term "tag" may refer to the string associated with the device as well as the identifier information associated with the string which identifies the device. The term "tag" may also refer to the string itself separately from the corresponding identifier information.

In one embodiment, the hypervisor 116 of the host OS 102 may generate a tag 108 associated with a resource device of the computer system 100. For example, the hypervisor 116 may create a tag by storing a string associated with the memory device 112. The tag 108 may be an arbitrary string such as "database." The tag 108 may also include identifier information associated with the memory device 112. For example, the identifier information associated with the memory device 112 may include a PCI, SCSI, and/or MAC address of the device, a serial number of the device, bus information, a port number, or other identifying information. This identifier information may be generated automatically by the hypervisor 116, host OS 102, virtualization manager 118, or other component of the computer system 100.

In the depicted embodiment, the virtualization manager 118 may be included within the computer system 100. The virtualization manager 118 may be remote relative to the host machine or host OS 102. In some embodiments, the virtualization manager 118 facilitates input of the tag as well as generation of the identifier information included in the tag. The manager 118 may also determine a location for storing the tag 108 for access by the VMs 104 and 106. In some embodiments, the virtualization manager 118 may be located outside of the computer system 100. For example, the virtualization manager 118 may be located on the network 101. Alternatively, the tag and identifier information 108 may be submitted and managed by another source outside the computer system 100 such as a human user or another computer system (not shown).

The tag 108 may be stored locally to the computer system 100. For example, the tag 108 may be stored to the memory 112. The tag 108 may also be stored to the network 101. For example, the tag 108 may be stored to a web service operating in the network 101 or to a network storage device. The tag 108 may also be stored to one or more of the virtual machines 104 and 106. For example, the tag 108 may be stored to a BIOS of one or more of the virtual machines 104 and 106.

The tag 108 may be generated in response to a request to provision one or more of the virtual machines 104 and 106. The tag 108 may also be generated upon detection of a device being added to the computer system 100 or to the network 101. In some embodiments, the tag 108 may be maintained and updated based on a routine or schedule.

In some embodiments, the tag 108 may be communicated, stored, or maintained in a manner or format specific to the device to which it corresponds. For example, a tag 108 corresponding to the I/O device 110 may be stored local to the computer system 100 while a tag 108 associated with the memory 112 may be stored to a BIOS. Other embodiments may include other generation, association, and/or maintenance schemes.

In the illustrated embodiment, the virtual machine 104 may be an existing virtual machine while the VM 106 may be requested but not yet provisioned as a new virtual machine. In the case of the existing VM 104, a device may be requested by a provisioning entity (such as a virtualization manager 118 or hypervisor 116) for the VM 104 for addition to the VM 104 or the existing resources of the VM 104. The computer system 100 may generate a tag 108 for the requested device and provide the tag 108 to the existing VM 104. A new device detected by the computer system 100 may also be added to the computer system 100. For example, if a disk is added to the computer system 100, a new tag 108 corresponding to the new disk may be created. The new disk may be requested for addition to the existing VM 104. In response to the request, the tag 108 may be provided to the existing VM 104 and the disk provisioned for use by the existing VM 104.

Additionally or alternatively, the computer system 100 may receive a request to provision the new VM 106. As an example, during the process of provisioning the new VM 106, the hypervisor 116 may determine what devices have been requested or might be compatible with the request for the new VM 106. The hypervisor 116 may generate a tag 108 for each device to be added to the new VM 106 or identify existing tags 108 for the devices and provide them to the new VM 106. As described above, the process of providing the tag 108 to the virtual machines 104 and 106 may be accomplished through one or more different mechanisms. For example, the tag 108 may be stored on a virtual disk created by the hypervisor 116. The tag 108 may be provided to a web service which provides the tag 108 to the virtual machines 104 and 106. The tag may also be stored to a location accessible to the virtual machines 104 and 106 such as a BIOS, a network attached storage, or other storage location.

The virtual machines 104 and 106 may include a guest OS to detect and interpret the tag 108. For example, upon detection of the tag 108, the guest OS may identify the resource corresponding to the tag, interpret the information associated with the tag, and establish the identity, address, configuration, optimization, policies, or some other characteristic(s) of the device. These characteristics may also be communicated to applications or programs that may access or interface with the device.

Figure 2:
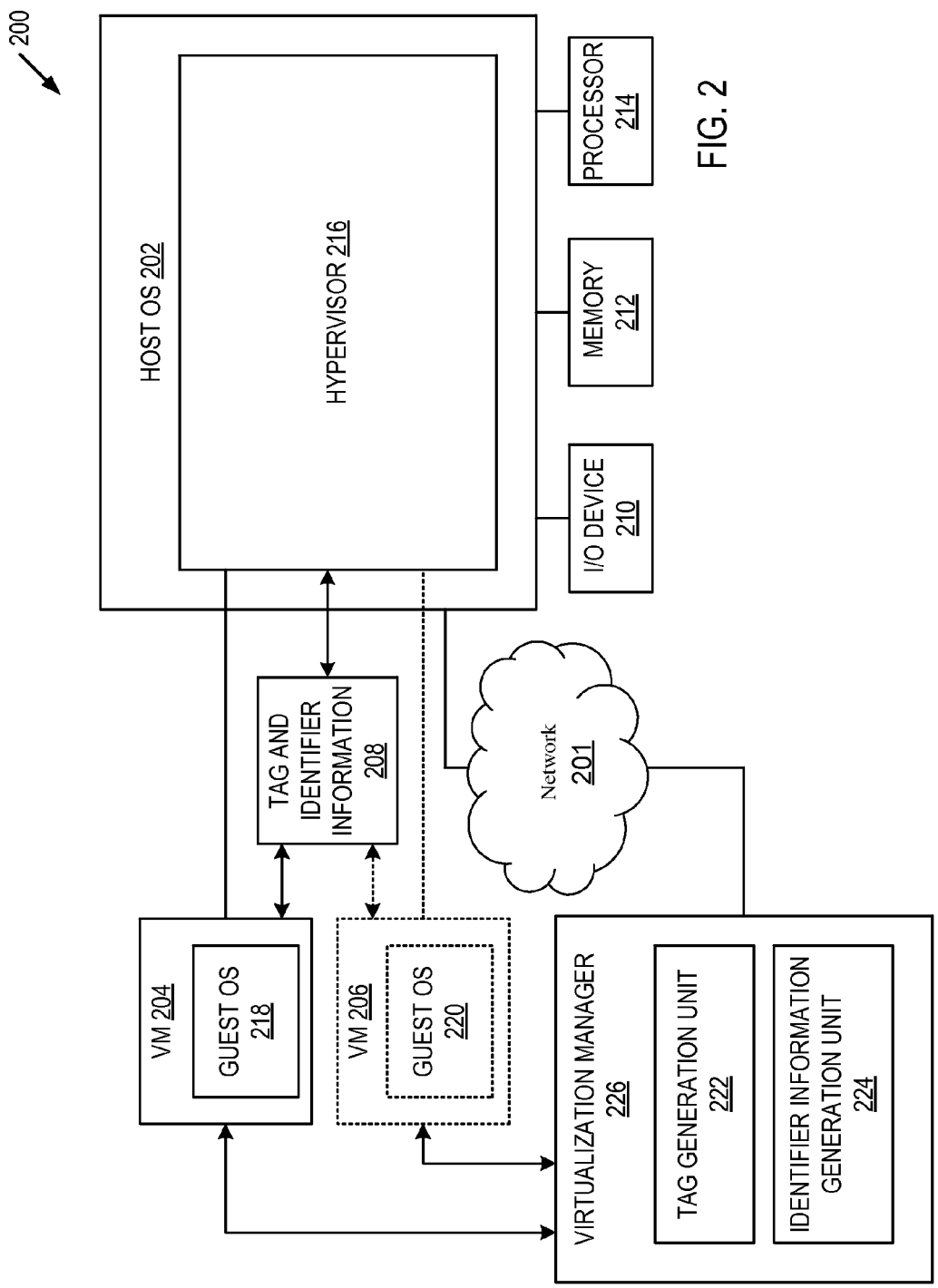
FIG. 2 is another system for managing devices for a virtual machine in accordance with one or more aspects of the present disclosure.

In FIG. 2, another system for managing devices for a virtual machine in accordance with one or more aspects of the present disclosure is shown. Similar to system 100 of FIG. 1, system 200 may include host OS 202 and hypervisor 216 for managing VMs 204 and 206 as well as other similar components. However, in the embodiment depicted, the virtualization manager 226 is connected to the host OS 202 and the VMs 204 and 206 via the network 201. In some cases, the virtualization manager 226 may store the tag and identifier information 208 at a separate location on the network for access by the VMs 204 and 206. In the illustrated embodiment, the virtual machines 204 and 206 include guest operating systems (guest OS) 218 and 220 respectively. Each of guest OS 218 and 220 may be capable of interacting with host OS 202 to obtain tag and identifier information 208 or may obtain tag and identifier information 208 from the virtualization manager 226 or from some other location or resource where the tag and identifier information 208 has been stored by the virtualization manager 226.

The illustrated virtualization manager 226 includes a tag generation unit 222 and an identifier information generation unit 224. The tag generation unit 222 generates a string corresponding to one or more devices (such as the I/O device 210, the memory 212, and the processor 214). The output of the tag generation unit 222 may be added to an argument associated with the resource. For example, the argument may be incorporated into a script of a boot sequence. The script may stored to a non-volatile portion of a system memory, a separate storage device, or a network resource. The script may then be executed by a processing device during a power-up or other program carried out by the processing device. One example of a script for a boot sequence for a cloud virtual machine may appear as follows:

cloud boot-machine \
 --disk file=/some/disk/image \
 --disk file=/some/other/disk/image \
 --network host=eth0 \
 --network host=eth1

Note that the boot sequence script above provides for a booted machine with two disks and two network interfaces. However, no context or identifying parameters are provided to the booted machine. In order to provide identification, a new parameter may be given so as to allow the user or provisioning entity to invoke it. A boot sequence script for a cloud virtual machine with the new parameter may appear as follows:

cloud boot-machine \
 --disk file=/some/disk/image,tag=root \
 --disk file=/some/other/disk/image,tag=database \
 --network host=eth0,tag=frontend \
 --network host=eth1,tag=backend
--Emphasis (bold) added--

In this script, a supplemental parameter or part of a "tag" has been added. The user or system adding the tag to the script need not provide any information at this point regarding what guest hardware the new virtual machine 206 might have. The tag 208 may be "root" which serves as a note or tells the user that the disk image will operate as storage for a root file system or directory. The tag for a root directory may also be less intuitive such as "C" or "top". Once the tag has been selected and incorporated, the hypervisor 216 or the virtualization manager 226 may decide to expose the various devices or resources to a virtual machine with some sort of identifier. For example, it may be decided that the first disk should be exposed as a PCI device, the second disk as a SCSI device, the first network interface as a PCI device, and the second network interface as a USB device. Other information may also be included such as bus information, serial identifiers, etc. In collecting and associating this information, the association of the tag and the identifier information may be stored. For example, the identifier information of the tag may be stored and appear as follows:

First disk
 tag=root
 bus=pci
 pciaddress=00:01:01.0
 serial=virtualdisk0001
 # Second disk
 tag=database
 bus=scsi
 scsiaddress=0.0.1.0
 serial=virtualdisk0002
 # First network interface
 tag=frontend
 bus=pci
 pciaddress=00:01:02.0
 macaddress=02:01:ca:fe:01:02
 # Second network interface
 tag=backend
 bus=usb
 usbport=01.02
 macaddress=02:01:ca:fe:01:03

This identifier information of the tag may be exposed to the virtual machine by storing them to a virtual disk, providing them to a web service accessible to the virtual machine, storing them to a BIOS, or other sharing mechanisms.

While the identifier is shown with a particular format, other formats may be applied. For example, a different code structure or language format of the identifier information may be applied based on the sharing mechanic used to make the identifier information available to the virtual machine. For example, a first format may be used to store the identifier information of the tag when the sharing mechanic is to make the identifier information available through a disk image. A second format may be more advantageous for sharing the identifier information via a web service. A third format may be more efficient for storing the identifier information to a BIOS for access by the guest OS of the VM. Other formats and sharing mechanics may be applied.

Once the tag is detected and the identifier information is obtained, the guest OS 220 or some other tool for setting up the virtual machine 206 (such as a hypervisor or a virtualization manager) may apply the identifier information to facilitate setup of the virtual machine 206 with the corresponding devices.

As an example of one advantage of applying a tag with the corresponding identifier information, assume that a new or existing virtual machine has received a request to configure a PostgreSQL database. The identifier information may be queried to identify the disk associated with the tag. If the identifier information includes a PCI address, the virtual machine will look to the PCI bus to identify the disk to use for the PostgreSQL database. As a result, the user provisioning the virtual machine can build a disk image or other resource that can automatically configure devices for specific tasks without needing to know or forecast or even assume exactly what type of device the virtual machine will need.

Figure 3:
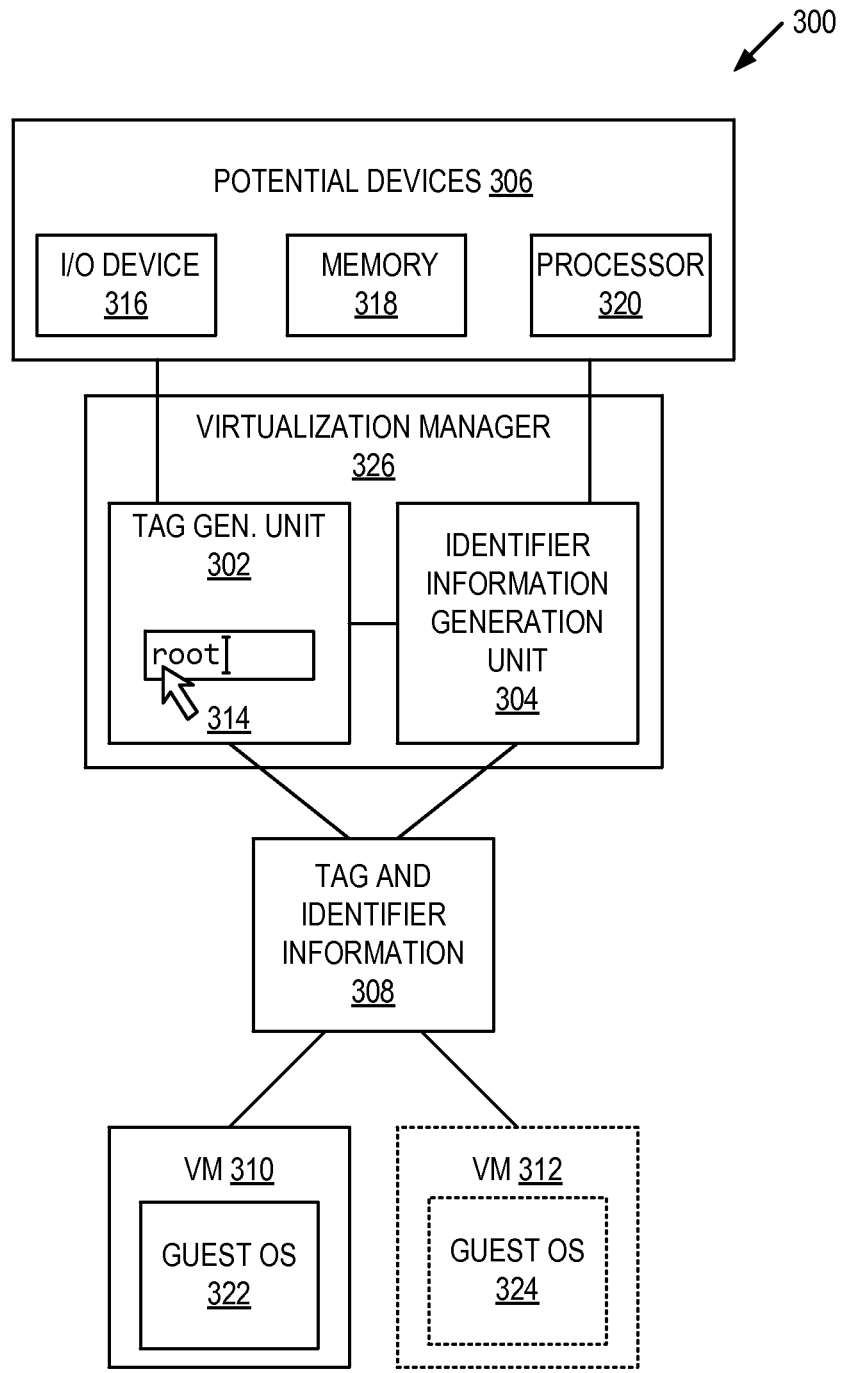
FIG. 3 is yet another system for managing devices for a virtual machine in accordance with one or more aspects of the present disclosure.

FIG. 3 is yet another system 300 for managing devices 306 for a virtual machine in accordance with one or more aspects of the present disclosure. Similar to system 100 of FIG. 1 and system 200 of FIG. 2, system 300 may include virtual machines (VMs) 310 and 312 as well as other similar components. However, in the depicted embodiment, each of the components are network connected. For example, the potential devices 306 may be network connected devices in communication with the virtualization manager 326 over a network such as a cloud network. The depicted tag and identifier information 308 may be stored or provided by a network resource that is separate from the virtualization manager 326 and the potential devices 306. Additionally, the VMs 310 and 312 may be created and accessed over a network by the virtualization manager 326 or some other device such as a hypervisor. While each of the components of the system 300 have been described as separate network connected devices, some embodiments of the system may include one or more of the depicted components as locally situated to another.

In the illustrated example, the virtualization manager 326 includes a tag generation (gen.) unit 302 and the identifier information generation unit 304. The tag generation unit 302 includes an entry field 314 to allow a user or provisioning entity to enter a string for use as a tag. Examples of acceptable strings or entries are discussed above with reference to previous figures.

In the depicted embodiment, the user may enter a tag to the entry field 314. The tag generation unit 302 receives the tag and associates the tag with a selected device from among the potential devices 306. For example, the potential devices 306 may include an input/output (I/O) device 316, a memory device 318, and a processor 320, and the user may select the memory device 318 from the potential devices 306. The user may input the term "root" as depicted in FIG. 3. The term "root" may be associated with the memory device 318 and the identifier information generation unit 304 generates identifier information corresponding to the memory device 318 and associates that information with the tag input by the user. The identifier information may include a PCI or MAC address or serial number for the memory 318. The identifier information may also include policy, format, structure, power requirements, protocol, or other information that may be useful to a guest OS 322 or 324 of a VM 310 or 312 respectively. The identifier information may be stored together as tag and identifier information 308. The tag and identifier information may be stored separately by its components or other divisions to separate locations or groups on a local or remote storage location or structure.

In some embodiments, a single tag is associated with a device. In other embodiments, multiple tags may be associated with a single device. For example, the memory device may have an associated tag of "root" as well as a second associated tag of "parent" and a third associated tag of "active." Each tag may have an associated version of the identifier information. For example, the "root" tag may only specify the PCI information of the memory device 318 while the "parent" tag includes information relaying a serial number for the memory device 318 and a format for the device 318. The "active" tag may include associated information to provide to a VM that the memory device is configured to store an active DOS working directory. Alternatively, one or more or a plurality of tags may have identical associated identifier information for the associated device. Other combinations of tags and information may be applied. In some embodiments, a guest OS 322 of a VM 310 may look up only a single tag of a plurality of tags associated with a specific device. In other embodiments, the guest OS 322 may look up more than one tag for a specific device.

Figure 4:
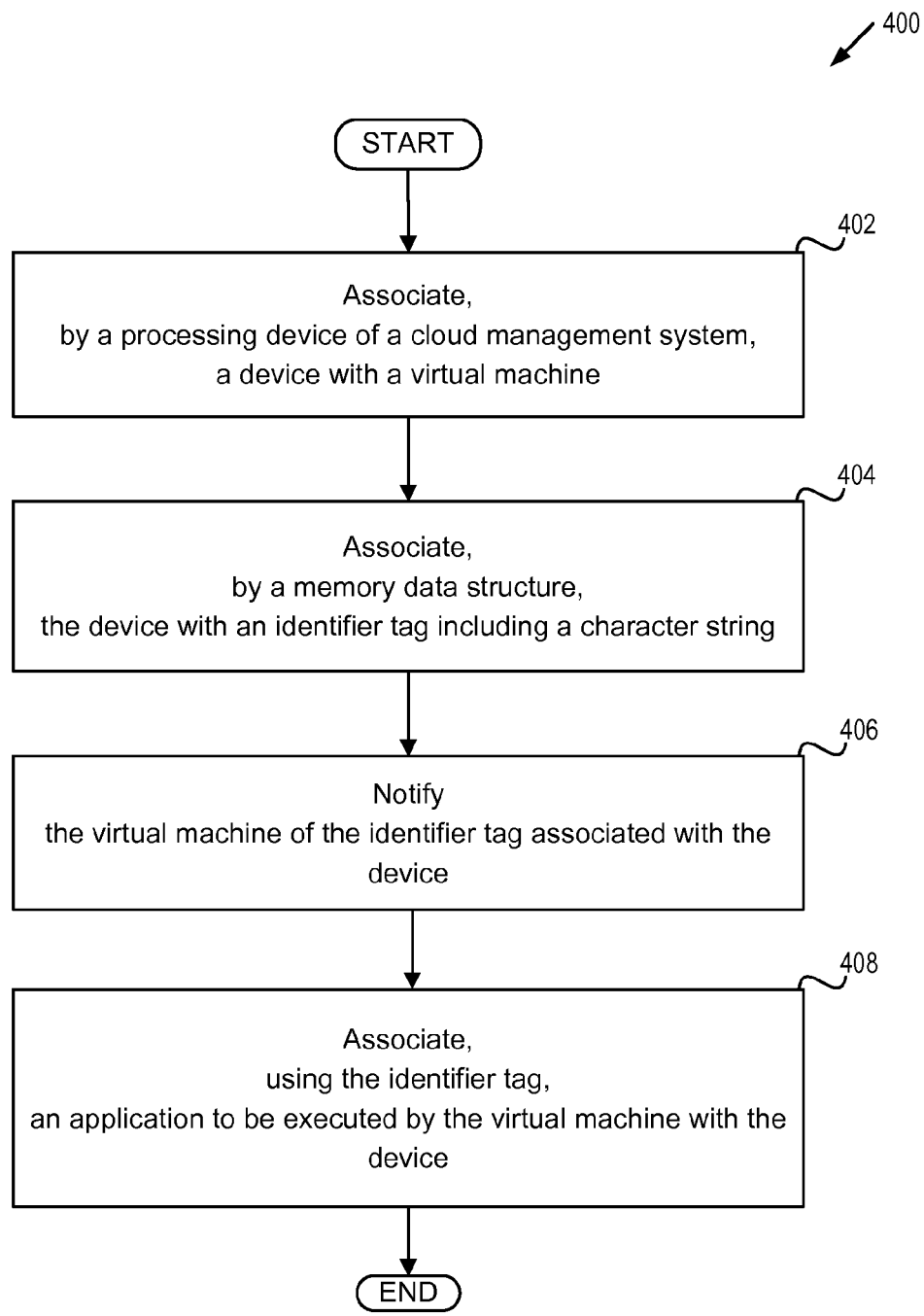
FIG. 4 depicts a flow diagram of a method for managing devices for a virtual machine in accordance with one or more aspects of the present disclosure.

FIG. 4 depicts a flow diagram of a method 400 for managing devices for a virtual machine in accordance with one or more aspects of the present disclosure. In some embodiments, the computer system 100 or the hypervisor 116 of the computer system 100 of FIG. 1 may perform method 400 to manage devices for a virtual machine. The method 400 may be performed by processing logic that may comprise hardware (circuitry, dedicated logic, etc.), software (such as is run on a general purpose computer system or a dedicated machine), or a combination of both. Alternatively, in some other embodiments, some or all of the method 400 might be performed by other components of computer system. As noted above, the portions of the method 400 depicted in FIG. 4 can be performed simultaneously or in a different order than that depicted.

Method 400 begins at block 402 where a processing device of a cloud management system associates a device with a virtual machine. The virtual machine may be a new or an existing virtual machine. The cloud management system may be a virtualization manager, a hypervisor, or another processing device to manage resources, devices, and machines on the cloud. At block 404, a memory data structure associates the device with an identifier tag. The identifier tag includes a character string. The identifier tag may also include identifier information which identifies the device by an address, interface, serial number, function, or other unique characteristic. At block 406, the virtual machine is notified of the identifier tag associated with the device. For example, the virtual machine may be notified by detecting the tag and/or identifier stored at a disk location, requested from a web service, or stored to a BIOS or other structure. At block 408, the identifier tag is used to associate an application to be executed by the virtual machine with the device. In some embodiments, the identifier tag can be accessed by the guest OS of the virtual machine to locate and identify a new device and a specific function or operation for which the device is intended or suited. This identifier information may be communicated to an application on the virtual machine by the guest OS or extracted by the application itself from wherever the identifier information is stored. The application may require or request access to a device of the identified type or function to operate on the virtual machine. With the provided identifier information, the application may access the device based on the identifier information and use the device in execution of the application.

Figure 5:
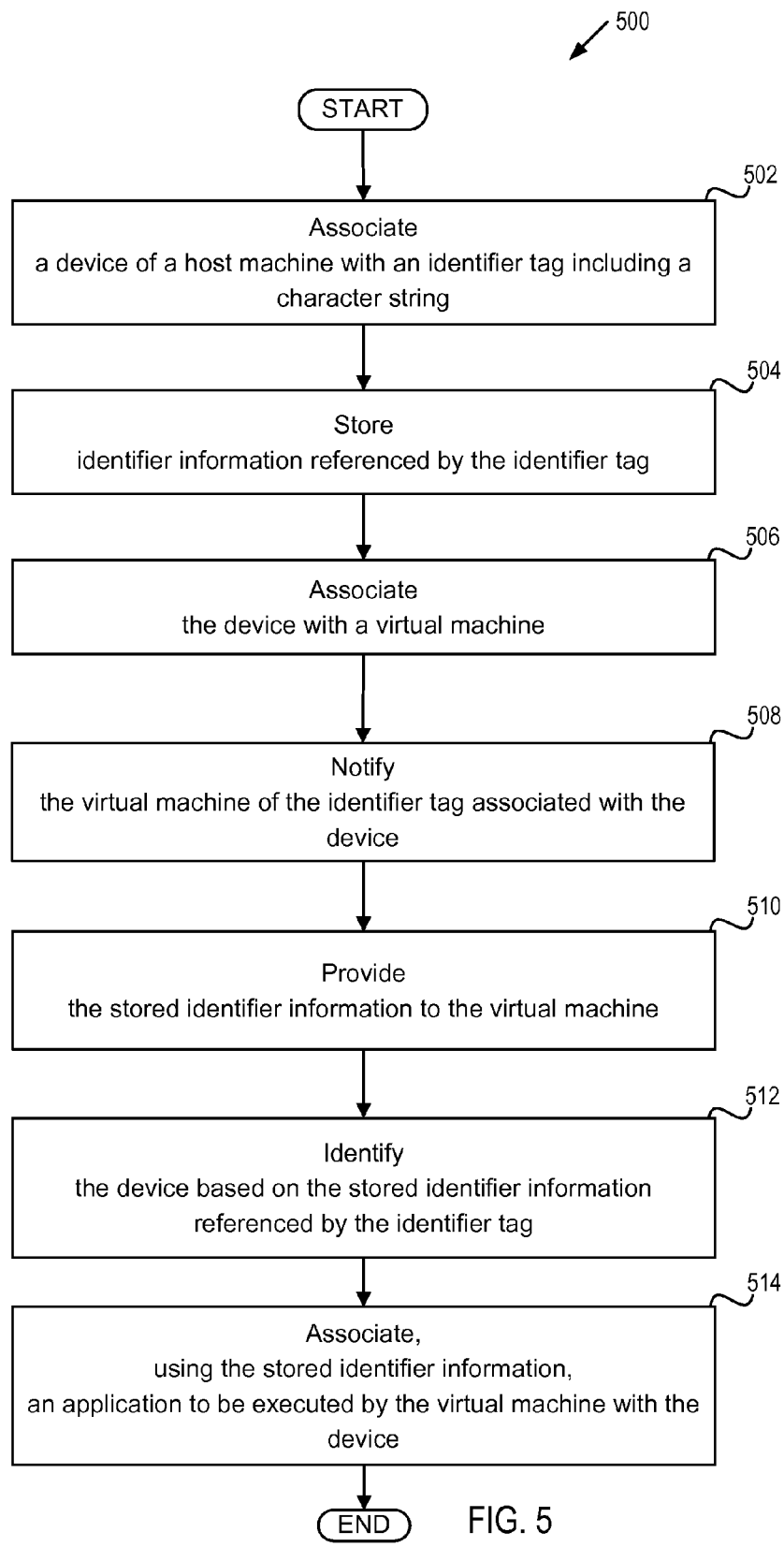
FIG. 5 depicts a flow diagram of another method for managing devices for a virtual machine in accordance with one or more aspects of the present disclosure.

FIG. 5 depicts a flow diagram of another method 500 for managing devices for a virtual machine in accordance with one or more aspects of the present disclosure. At block 502, a device of a host machine is associated with an identifier tag including a character string. The character string may be entered by a user or generated automatically. The string may be arbitrary or have some intuitive or direct connection with the device. The device may also be a network attached device, a remote device, or some other device. At block 504, identifier information referenced by the identifier tag is stored. The information may be stored to a disk image, a BIOS, made available through a web service, or otherwise stored or made accessible for a virtual machine. At block 506, the device is associated with a virtual machine. The device may be associated with the virtual machine by a hypervisor or other virtualization manager. At block 508, the virtual machine is notified of the identifier tag associated with the device. The virtual machine may be notified of the identifier tag by placing the identifier tag in a location in which the virtual machine will discover the tag identifier. The identifier tag may also be provided by another service or in another structure. At block 510, the stored identifier information is provided to the virtual machine. As described above, the identifier tag may be written or stored to one location while the identifier information may be stored separately. For example, the identifier tag may be written to a script for a boot sequence while the identifier information is stored to a BIOS. Other embodiments may implement other storage schemes. At block 512, the device is identified based on the stored identifier information referenced by the identifier tag. The information may include specific characteristics of the device such as addresses, device formats, interfaces, etc. The information may include one characteristic or a plurality of characteristics of the device. At block 514, the stored identifier information associates an application to be executed by the virtual machine with the device. The information may be received by a guest OS and provided to the application or obtained by the application directly. Other embodiments may provide other manners of communicating the information to the application.

Figure 6:
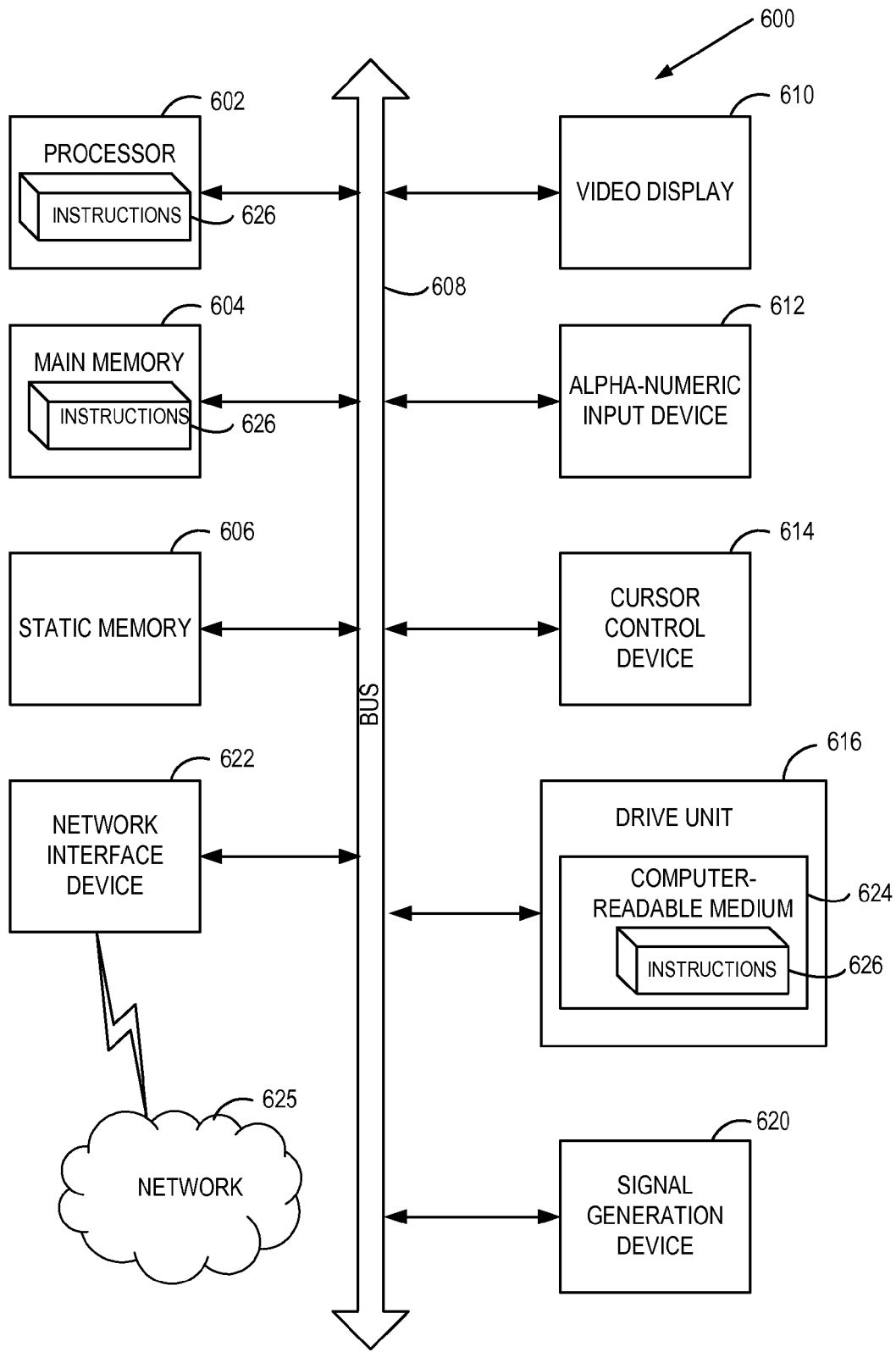
FIG. 6 depicts a block diagram of an example computer system operating in accordance with one or more aspects of the present disclosure.

FIG. 6 depicts an example computer system 600 which can perform any one or more of the methods described herein for isolating network resources in a virtualized environment. In one example, computer system 600 may correspond to computer system 100 of FIG. 1. The computer system may be connected (e.g., networked) to other computer systems in a LAN, an intranet, an extranet, or the Internet. The computer system 600 may operate in the capacity of a server in a client-server network environment. The computer system 600 may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a drive unit 616, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions that may include instructions to execute instructions 626 for performing the operations and steps discussed herein. For example, in one embodiment, the instructions 626 may perform any one of the methods of flow diagram 400 of FIG. 4 and flow diagram 500 of FIG. 5.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The drive unit 616 or secondary memory may include a computer-readable medium 624 on which is stored one or more sets of instructions 626 (e.g., instructions for the instructions) embodying any one or more of the methodologies or functions described herein. Instructions for the instructions 626 may also reside, completely or at least partially, within the main memory 604 and/or within the processor 602 during execution thereof by the computer system 600, the main memory 604 and the processor 602 also constituting computer-readable media. Instructions 626 may further be transmitted or received over a network via the network interface device 622. The instructions 626 may further be transmitted or received over a network 625 via the network interface device 622.

The non-transitory computer-readable storage medium 624 may also be used to store the instructions 626 persistently. While the computer-readable storage medium 624 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, non-transitory computer-readable storage mediums, solid-state memories, optical media, and magnetic media.

The instructions 626, components and other features described herein can be implemented as discrete hardware components or integrated in the functionality of hardware components such as ASICS, FPGAs, DSPs or similar devices. In addition, the instructions 626 can be implemented as firmware or functional circuitry within hardware devices. Further, the instructions 626 can be implemented in a combination hardware devices and software components. For example, the functionality of this module can exist in a fewer or greater number of modules than what is shown, with such modules residing at one or more computing devices that may be geographically dispersed. The modules may be operable in conjunction with network 625 from which it may receive and provide relevant information regarding isolating network resources in a virtualized environment.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "determining", "allocating", "notifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
    receiving, by a processing device of a cloud management system, a request to provision a device for a virtual machine;
    receiving, by the processing device, a character string in connection with the request to provision the device for the virtual machine;
    associating, by a memory data structure, the device with an identifier tag comprising the character string;
    storing, by the processing device, identifier information about the device when the device is provisioned for the virtual machine, wherein the identifier information indicates an application-specific functional designation of the device;
    automatically associating, by the processing device, the identifier information with the identifier tag;
    exposing to the virtual machine an association between the identifier tag and the identifier information to permit a guest operating system of the virtual machine to configure an application to use the device based on the identifier tag and the identifier information associated with the identifier tag; and
    associating, using the identifier tag, an application to be executed by the virtual machine with the device.

2. The method of claim 1, wherein the exposing comprises storing the identifier tag within a data file made available to the guest operating system of the virtual machine.

3. The method of claim 1, wherein the exposing comprises exposing a web service to the guest operating system of the virtual machine, wherein the web service is to communicate a response comprising the identifier tag to the guest operating system of the virtual machine.

4. The method of claim 1, wherein the exposing comprises storing the identifier tag to a basic input/output system (BIOS) accessible by the guest operating system of the virtual machine.

5. The method of claim 1, further comprising receiving the character string as a parameter of the request to provision, wherein the request is a request to provision a new virtual machine.

6. The method of claim 1, further comprising receiving the character string as a parameter of the request to provision, wherein the request is a request to provision the device to an existing virtual machine.

7. The method of claim 1, wherein the identifier tag identifies the device by at least one of a peripheral component interconnect (PCI) address, a media access control (MAC) address, a serial number of the device, or a string of the device.

8. The method of claim 1, wherein the device comprises a physical device.

9. The method of claim 1, wherein the device comprises a virtual device.

10. A system comprising:
    a memory device; and
    a processor device of a cloud management system, the processor device operatively coupled to the memory device, the processor device to:

receive a request to provision a device for a virtual machine;
receive a character string in connection with the request to provision the device for the virtual machine;
associate the device with an identifier tag comprising the character string;
store identifier information about the device when the device is provisioned for the virtual machine, wherein the identifier information indicates an application-specific functional designation of the device;
automatically associate the identifier information with the identifier tag;
expose to the virtual machine an association between the identifier tag and the identifier information to permit a guest operating system of the virtual machine to configure an application to use the device based on the identifier tag and the identifier information associated with the identifier tag; and
associate, using the identifier tag, an application to be executed by the virtual machine with the device.

11. The system of claim 10, wherein, to expose the association between the identifier tag and the identifier information, the processor device is further to store, in the memory device, the identifier tag within a data file made available to the guest operating system of the virtual machine.

12. The system of claim 10, wherein, to expose the association between the identifier tag and the identifier information, the processor device is further to expose a web service to the guest operating system of the virtual machine, wherein the web service serves a response containing the identifier tag to the guest operating system of the virtual machine.

13. The system of claim 10, wherein, to expose the association between the identifier tag and the identifier information, the processor device is further to store the identifier tag to a basic input/output system (BIOS) accessible to the guest operating system of the virtual machine.

14. The system of claim 10, wherein the processor is further to receive the character string as a parameter of the request to provision, wherein the request is a request to provision a new virtual machine.

15. The system of claim 10, wherein the processor device is further to receive the character string as a parameter of the request to provision, wherein the request is a request to provision the device to an existing virtual machine.

16. The system of claim 10, wherein the first identifier tag and the second identifier tag identifies the device by at least one of peripheral component interconnect (PCI) data, a media access control (MAC) address, a serial number of the device, or a string of the device.

17. The system of claim 10, wherein the device comprises a physical device.

18. The system of claim 10, wherein the device comprises a virtual device.

19. A non-transitory computer readable medium comprising executable instructions that when executed by a processing device, cause the processing device to:
associate a device of a host machine with a first identifier tag comprising a first character string;
store identifier information about the device when the device is provisioned for the virtual machine, wherein the identifier information indicates an application-specific functional designation of the device and the identifier information is referenced by the first identifier tag;
associate the device with a virtual machine;
expose to the virtual machine an association between the identifier tag and the identifier information to permit a guest operating system of the virtual machine to configure an application to use the device based on the identifier tag and the identifier information associated with the identifier tag
provide the identifier information for the identifier tag to the virtual machine;
identify the device in view of the identifier information for the identifier tag; and
associate, using the identifier information for the first identifier tag, an application to be executed by the virtual machine with the device.

20. The non-transitory computer readable medium of claim 19, wherein the identifier information is stored in a format in view of a manner in which the identifier information is provided to the virtual machine.

* * * * *